(12) United States Patent
Dou et al.

(10) Patent No.: US 10,776,128 B2
(45) Date of Patent: Sep. 15, 2020

(54) METHOD AND DEVICE FOR LOW POWER POWER-ON PROCESSING

(71) Applicant: ZTE CORPORATION, Shenzhen (CN)

(72) Inventors: Mingming Dou, Shenzhen (CN); Wen Li, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 102 days.

(21) Appl. No.: 16/069,551

(22) PCT Filed: Mar. 8, 2016

(86) PCT No.: PCT/CN2016/075891
§ 371 (c)(1),
(2) Date: Jul. 12, 2018

(87) PCT Pub. No.: WO2017/121023
PCT Pub. Date: Jul. 20, 2017

(65) Prior Publication Data
US 2019/0026115 A1 Jan. 24, 2019

(30) Foreign Application Priority Data
Jan. 12, 2016 (CN) .......................... 2016 1 0018875

(51) Int. Cl.
*G06F 9/4401* (2018.01)
*G06F 11/30* (2006.01)
(Continued)

(52) U.S. Cl.
CPC .......... *G06F 9/4401* (2013.01); *G06F 1/3212* (2013.01); *G06F 1/3287* (2013.01);
(Continued)

(58) Field of Classification Search
None
See application file for complete search history.

(56) References Cited

U.S. PATENT DOCUMENTS

| 8,026,636 B2 | 9/2011 | Oh | |
|---|---|---|---|
| 8,797,171 B2* | 8/2014 | Yasuda | G06F 1/26 340/636.1 |

(Continued)

FOREIGN PATENT DOCUMENTS

| CN | 101295868 A | 10/2008 |
|---|---|---|
| CN | 104243702 A | 12/2014 |

(Continued)

OTHER PUBLICATIONS

International Search Report in international application No. PCT/CN2016/075891, dated Sep. 26, 2016, 2 pgs.
(Continued)

*Primary Examiner* — Jaweed A Abbaszadeh
*Assistant Examiner* — Cheri L Harrington
(74) *Attorney, Agent, or Firm* — Cooper Legal Group, LLC

(57) ABSTRACT

The present invention discloses a method for low power power-on processing, the method comprising: when a terminal receives a power-on event in a low power power-off state, triggering a system to start according to the power-on event, wherein a battery voltage in the low power power-off state is less than or equal to a power-off voltage and is greater than or equal to a system starting voltage; and after the system is started, presenting a low power prompt via a screen.

10 Claims, 4 Drawing Sheets

(51) Int. Cl.
*G06F 11/32* (2006.01)
*G06F 1/32* (2019.01)
*G06F 9/54* (2006.01)
*G06F 1/3212* (2019.01)
*G06F 1/3287* (2019.01)

(52) U.S. Cl.
CPC .............. *G06F 9/542* (2013.01); *G06F 11/30* (2013.01); *G06F 11/3062* (2013.01); *G06F 11/32* (2013.01); *G06F 11/327* (2013.01)

(56) References Cited

U.S. PATENT DOCUMENTS

| | | | |
|---|---|---|---|
| 10,228,751 B2* | 3/2019 | Andrews | G06F 1/3296 |
| 2006/0117192 A1* | 6/2006 | Nokkonen | G06F 1/305 |
| | | | 713/300 |
| 2010/0219687 A1 | 9/2010 | Oh | |
| 2012/0047380 A1* | 2/2012 | Nurmi | G06F 1/3203 |
| | | | 713/320 |
| 2013/0148478 A1* | 6/2013 | Kaneko | G04G 15/00 |
| | | | 368/109 |
| 2014/0068310 A1* | 3/2014 | Sultenfuss | G06F 1/28 |
| | | | 713/340 |
| 2015/0089210 A1* | 3/2015 | Lai | G06F 9/442 |
| | | | 713/2 |
| 2015/0121112 A1* | 4/2015 | Wei | H04W 52/0264 |
| | | | 713/324 |
| 2015/0217652 A1* | 8/2015 | Chupin | B60W 50/14 |
| | | | 320/137 |
| 2016/0041597 A1* | 2/2016 | Graham | G06F 1/1694 |
| | | | 713/323 |
| 2016/0259649 A1* | 9/2016 | Poornachandran | G06F 9/4401 |
| 2016/0349831 A1* | 12/2016 | Lim | G06F 1/3212 |
| 2017/0003732 A1* | 1/2017 | Wendel | G06F 1/3287 |
| 2017/0090537 A1* | 3/2017 | Elad | G06F 1/266 |

FOREIGN PATENT DOCUMENTS

| | | |
|---|---|---|
| CN | 104348140 A | 2/2015 |
| CN | 104657188 A | 5/2015 |

OTHER PUBLICATIONS

English Translation of the Written Opinion of the International Search Authority in international application No. PCT/CN2016/075891, dated Sep. 26, 2016, 3 pgs.

* cited by examiner

METHOD AND DEVICE FOR LOW POWER POWER-ON PROCESSING

TECHNICAL FIELD

The disclosure relates to the field of communications, and more particularly to a method and apparatus for performing power-on processing in a low-battery state.

BACKGROUND

When a battery voltage of an existing terminal is relatively low, a user is usually prompted by flashing or keeping-on of an indicator lamp. However, the user often mistakenly believes that a mobile phone is out of order, which causes return of the mobile phone. This has become one of the important mobile phone return reasons for mobile phone manufacturers. Additionally, a Power Management Integrated Circuit (PMIC) of the terminal cannot individually charge a battery and supply power to a system, so that when the battery voltage is low, the terminal cannot be smoothly powered on and the screen cannot be lighted. This will cause the mobile phone to remain in a black screen state, and the user experience is poor.

Therefore, the existing low-battery processing method has a poor use experience, and there is a need for a method that is capable of effectively prompting the user that a current terminal is in a low-battery state through a screen when the terminal is powered on in the low-battery state.

SUMMARY

In view of this, it is intended to provide a method and apparatus for performing power-on processing in a low-battery state in embodiments of the disclosure, at least solving the problem in the existing technology, and providing a method capable of effectively prompting a user that a current terminal is in a low-battery state through a screen when the terminal is powered on in the low-battery state.

The technical solution of the embodiment of the disclosure is implemented as follows.

A method for performing power-on processing in a low-battery state in the embodiment of the disclosure includes the following operations. When a terminal receives a power-on event in a low-battery power-off state, a system is triggered to start according to the power-on event. A battery voltage in the low-battery power-off state is less than or equal to a power-off voltage and is greater than or equal to a system starting voltage. After the system is started, a low-battery prompt is presented in a screen.

In the above solution, before a terminal receives the power-on event in the low-battery power-off state, the method further includes that: the terminal is controlled to enter a low-battery power-off state.

Specifically, the battery voltage is monitored to get a first voltage; and when the first voltage is less than or equal to the power-off voltage, the terminal is controlled to enter the low-battery power-off state.

In the above solution, the step that the terminal receives the power-on event in the low-battery power-off state includes that: when the terminal receives the power-on event, the battery voltage is detected to get a second voltage, and when the second voltage is less than or equal to the power-off voltage, it is determined that the terminal receives the power-on event in the low-battery power-off state.

In the above solution, after the system is started and before the low-battery prompt is presented in a screen, the method further includes that: a power-on type of the power-on event is judged; and corresponding power-on/off processing is performed according to the power-on type of the power-on event after the low-battery prompt is presented. The power-on type includes: charging power-on and non-charging power-on.

In the above solution, the step that corresponding power-on/off processing is performed according to the power-on type of the power-on event after the low-battery prompt is presented includes that: when the power-on type is charging power-on, the low-battery prompt is presented after the system is started, and the battery voltage is monitored to get a third voltage; and when the third voltage is greater than the power-off voltage, the low-battery prompt is stopped, and power-on processing is performed.

In the above solution, the step that corresponding power-on/off processing is performed after a low-battery prompt is presented according to the power-on type of the power-on event includes that:

when the power-on type is non-charging power-on, a low-battery prompt within a preset time period is presented after the system is started, and a power-off operation is executed after the low-battery prompt within the preset time period is presented.

In the above solution, the step that a low-battery prompt is presented includes that: preset data for the low-battery prompt is acquired from a storage area, and the data for the low-battery prompt is displayed.

In an embodiment of the disclosure, an apparatus for performing power-on processing in a low-battery state is provided, which includes: a trigger module and a low-battery prompt module.

The trigger module is arranged to trigger, when a terminal receives a power-on event in a low-battery power-off state, a system to start according to the power-on event, wherein a battery voltage in the low-battery power-off state is less than or equal to a power-off voltage and is greater than or equal to a system starting voltage; and the low-battery prompt module is arranged to present a low-battery prompt in a screen after the system is started.

In the above solution, the apparatus further includes a control module, arranged to control the terminal to enter a low-battery power-off state. The control module is arranged to monitor the battery voltage to get a first voltage, and control the terminal to enter the low-battery power-off state, when the first voltage is less than or equal to the power-off voltage.

In the above solution, the trigger module is further arranged to detect the battery voltage to get a second voltage when the terminal receives a power-on event, and determine that the terminal receives the power-on event in the low-battery power-off state when the second voltage is less than or equal to the power-off voltage.

In the above solution, the apparatus further includes a type judgment module, arranged to judge a power-on type of the power-on event, the power-on type including: charging power-on and non-charging power-on. The low-battery prompt module is further arranged to perform corresponding power-on/off processing according to the power-on type of the power-on event after the low-battery prompt is presented.

In the above solution, the low-battery prompt module is arranged to: in response to the power-on type being charging power-on, after the system is started, present the low-battery prompt and monitor the battery voltage to get a third voltage;

and when the third voltage is greater than the power-off voltage, stop the low-battery prompt and perform power-on processing.

In the above solution, the low-battery prompt module is arranged to: n response to the power-on type being non-charging power-on, present the low-battery prompt for a preset time period after the system is started, and execute a power-off operation after the low-battery prompt is presented for the preset time period.

In the above solution, in order to present the low-battery prompt, the low-battery prompt module is arranged to acquire preset data for the low-battery prompt from a storage area, and display the data for the low-battery prompt.

The trigger module, the low-battery prompt module, the control module and the type judgment module, when performing processing, may be implemented by a Central Processing Unit (CPU), a Digital Signal Processor (DSP) or a Field-Programmable Gate Array (FPGA).

According to the method for performing power-on processing in the low-battery state in the embodiment of the disclosure, when a terminal receives a power-on event in a low-battery power-off state, a system is triggered to start according to the power-on event, and after the system is started, a low-battery prompt is presented in a screen. A battery voltage in the low-battery power-off state is less than or equal to a power-off voltage and is greater than or equal to a system starting voltage. By means of the embodiment of the disclosure, when the terminal is in the low-battery power-off state, the battery voltage is less than or equal to the power-off voltage and is greater than or equal to the system starting voltage. Therefore, when the terminal in the low-battery power-off state receives a power-on event, the system is started with a sufficient voltage, and a low-battery prompt is presented, so that when powering on the terminal in the low-battery power-off state, a user can know that the current terminal is in the low-battery state according to the low-battery prompt after the system of the terminal is started, thereby achieving a better user experience effect without hardware update and chip upgrade.

DETAILED DESCRIPTION

The technical solutions will be further described in detail with reference to the accompanying drawings.

First Embodiment

Figure 1:
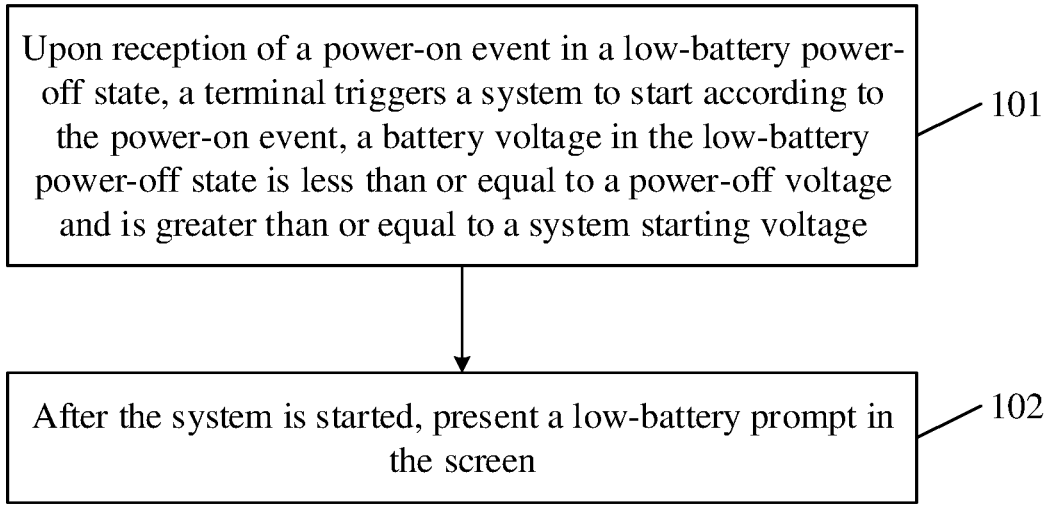
FIG. 1 is a flow diagram of a method for performing power-on processing in a low-battery state according to a first embodiment of the disclosure.

A method for performing power-on processing in a low-battery state is provided in a first embodiment of the disclosure. As shown in FIG. 1, the method includes the steps as follows.

At S101, when a terminal receives a power-on event in a low-battery and power-off state, the power-on event triggers a system to start. A battery voltage in the low-battery power-off state is less than or equal to a power-off voltage and is greater than or equal to a system starting voltage.

In the present embodiment, when the terminal receives the power-on event, it may be determined whether the terminal is in the low-battery power-off state in the following two modes.

In the first mode, before the terminal receives the power-on event in the low-battery power-off state, the method further includes controlling the terminal to enter the low-battery power-off state. Specifically, the battery voltage is monitored to get a first voltage; and when the first voltage is less than or equal to the power-off voltage, the terminal is controlled to enter the low-battery power-off state.

When a user normally uses a terminal in a power-on state, the terminal monitors its own battery voltage in real time, and the battery voltage at this time is referred to as a first voltage. When the first voltage is less than or equal to a power-off voltage, it indicates that the terminal is in a low-battery state at this time, and the terminal is controlled to be powered off, so that the terminal enters a low-battery power-off state. Later, when the terminal receives a power-on event, it can be determined that the terminal is previously in a low-battery power-off state according to the previous power-off state. The power-off voltage may be a system default value, or may be set by the user by selection, for example, may be set to be 3.8V.

In the second mode, when the terminal receives a power-on event, the battery voltage is detected to get a second voltage, and when the second voltage is less than or equal to the power-off voltage, it is determined that the terminal receives a power-on event in a low-battery power-off state. That is, when the terminal in the power-off state receives the power-on event, it is determined whether the power-off state of the terminal is a low-battery power-off state according to the current battery voltage. The power-off voltage may be a system default value, or may be set by the user by selection, for example, may be set to be 3.8V.

In the embodiment of the disclosure, when the terminal is in the low-battery power-off state, the battery voltage of the terminal is less than or equal to the power-off voltage and is greater than or equal to a system starting voltage. The system starting voltage is a threshold voltage for system starting, for example, may be set to be 2.8V.

When the user powers on the terminal in the low-battery power-off state, the terminal receives the power-on event, and the terminal performs a system starting process based on the trigger of the power-on event. Here, the system starting refers to power-on from the perspective of a developer, which is different from the power-on process viewed by the user. The system starting is a step in the power-on process of the terminal. For the terminal, the system starting is completed inside the terminal, and the user cannot see the process through the terminal. In the system starting process, only the code initialization of a system version is performed, when the system starting of the terminal is completed, it does not immediately enter a state in which the user can use the terminal; instead, the terminal executes some non-system codes before entering a normal power-on process. That is, the system is started to begin the power-on process.

Based on different power-on modes of users, the terminal may receive the power-on events of different power-on types: charging power-on and non-charging power-on. The charging power-on includes: charging through a USB or a charger. That is, a charging device, such as a mobile power supply, a power adapter connected to a power supply, is connected to the terminal; or rather, the power-on operation is performed, by, for example, pressing a power-on/off button when the terminal is in a power supply connected state, so as to perform charging power-on. The non-charging power-on includes: a power-on operation of the user by, for example, pressing the power-on/off button when the terminal is not connected to a power supply, etc., thereby receiving the user's operation of the power-on button without charging.

At S102, after the system is started, a low-battery prompt is presented in a screen.

After the system is started, the terminal presents a low-battery prompt in the screen. Here, the data for the low-battery prompt may be in a form of such as a picture, a text and a dynamic graph, which for example, may be preset and acquired from a storage area, and then displayed. The storage area may be a separate partition, or, the data for the low-battery prompt may be stored in other storage modes, such as, stored together with other data.

After the system is started and before a low-battery prompt is presented in the screen, a power-on type of the power-on event may be judged, and corresponding power-on/off processing is performed according to the power-on type of the power-on event after the low-battery prompt is presented.

Specifically, when the power-on type is charging power-on, after the system is started, a low-battery prompt is presented, and the battery voltage is monitored to get a third voltage; and when the third voltage is greater than the power-off voltage, the low-battery prompt is stopped, and the power-on processing is performed. When the power-on type is non-charging power-on, after the system is started, a low-battery prompt is presented for a preset time period and then a power-off operation is executed.

When the power-on reason for the terminal is a charging power-on event related to charging through, for example, a USB or a charger, a low-battery prompt is presented and charging is performed until the battery voltage is detected to be higher than the power-off voltage, and then power-on is performed to enter a normal charging state. When the power-on reason for the terminal is a non-charging power-on event such as pressing of the power-on/off button without charging the terminal, a low-battery prompt is presented for a preset time period. For example, after a low-battery picture or text prompt is presented for a preset time period, a power-off operation is executed.

By means of the embodiment of the disclosure, when the battery voltage is equal to or higher than the system starting voltage and is lower than or equal to the power-off voltage, the low-battery prompt is presented in the screen to prompt the user that the terminal is in a low-battery state currently; and when the battery voltage is higher than the power-off voltage, the power-on process is successfully completed, and charging is performed. When the voltage of the battery is the power-off voltage, since there is a certain amount of available electricity stored, and the system starting voltage can ensure that the power-on process smoothly enters a low-battery prompt stage. Therefore, the method of the embodiment of the disclosure can ensure that the terminal may prompt the user with the low battery, thereby achieving a good user experience effect.

In the embodiment of the disclosure, by means of optimization in three aspects, namely the configuration of the system starting voltage and the power-off voltage, the low-battery prompt in the screen, and different power-on/off processing corresponding to different power-on events, when powering on the terminal in the low-battery power-off state, the user can know that the current terminal is in a low-battery state according to the low-battery prompt after the system of the terminal is started, thereby achieving a better user experience effect without hardware update and chip upgrade. Here, the three aspects are explained respectively.

First, through the configuration of the system starting voltage and the power-off voltage, in the case where the battery has a certain amount of available electricity, the user is prompted that the terminal is run out of power, while the power-off process is performed. Here, in view of the problem of battery life, the difference between the system starting voltage and the power-off voltage is not too big, so as to make the mobile phone quickly enter a low-battery prompt stage when being connected to a charger again, so that the user can obtain a more direct and effective low-battery prompt.

Second, a low-battery prompt function is provided. Here, the low-battery prompt may involve display, backlight and partition. Picture flooding function and backlight control may vary according to different screen manufacturers. The storage mode of data for low-battery prompt may be separately adding a new partition or other modes. The low-battery prompt added by the technical solution is reflected in the power-on process triggered by a non-charging device such as a button after the terminal is powered off because of low battery, or is reflected when triggered by the charging device and the battery voltage is still low such that the terminal cannot be powered on.

Third, according to different power-on events, different power-on/off processing is performed, and processing of different scenarios is achieved for the response and control of various scenarios in the charging process during a low-battery prompt stage.

In the existing technology, the threshold voltage of the terminal includes a power-off voltage. Here, the power-off voltage in the existing technology has a certain difference from the power-off voltage in the present solution. When the battery voltage of the terminal is lower than the power-off voltage in the existing technology, the terminal is powered off. At this time, when the terminal is powered on, the terminal cannot be powered on. In another case, after waiting for a time period, a power-on operation is executed on the terminal in the existing technology, and the terminal is powered on. The main reason for that the terminal can be powered on at this time is that the voltage in the load of the terminal enters the battery when the terminal is in the power-off state, so that the terminal can be powered on.

However, the value of the power-off voltage in the embodiment of the embodiment is higher than the power-off voltage in the existing technology. When the terminal battery voltage is lower than or equal to the power-off voltage, a certain amount of electricity is retained in the battery to enable the terminal to perform a system starting process when being started by the user later.

Second Embodiment

Figure 2:
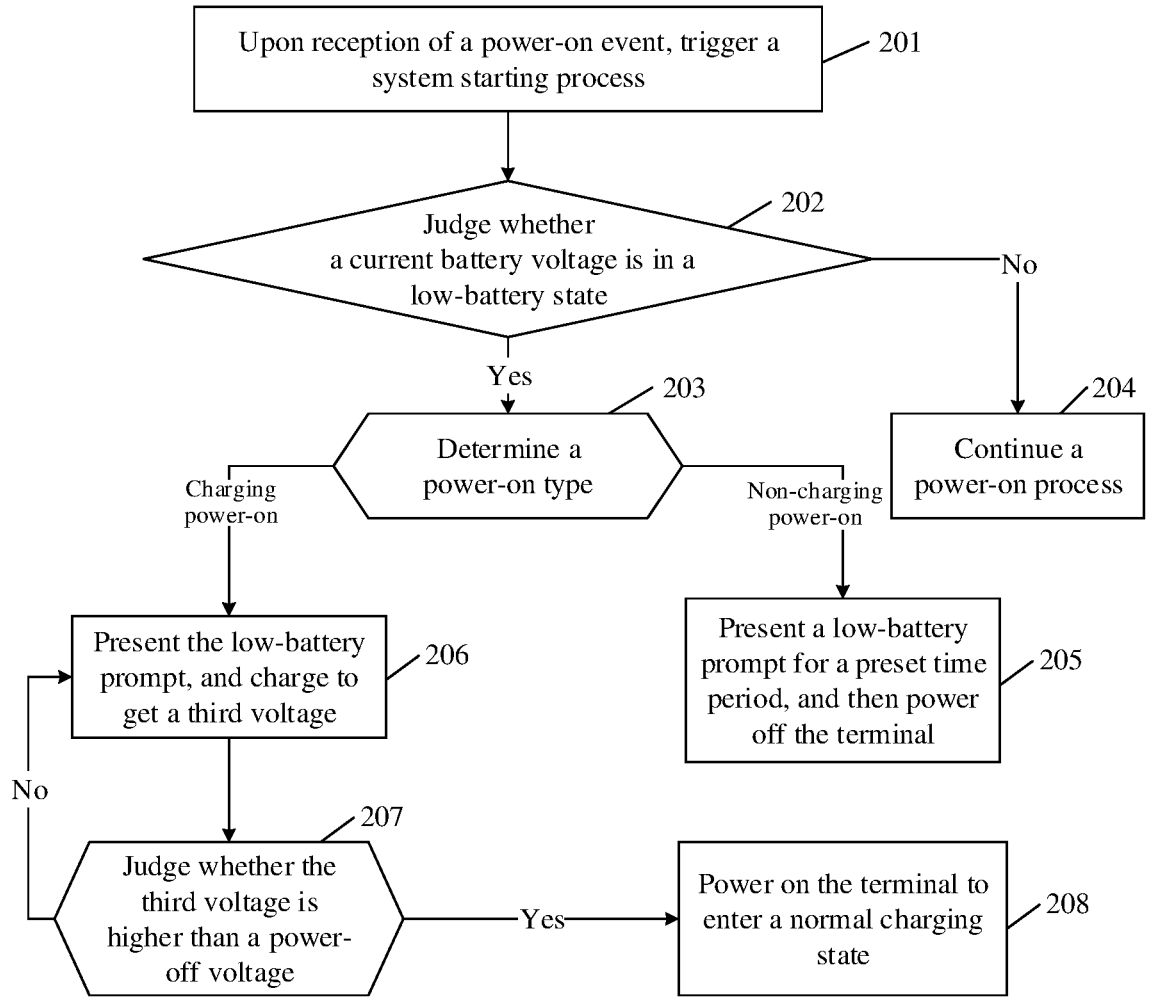
FIG. 2 is a flow diagram of a method for performing power-on processing in a low-battery state according to a second embodiment of the disclosure.
Figure 3:
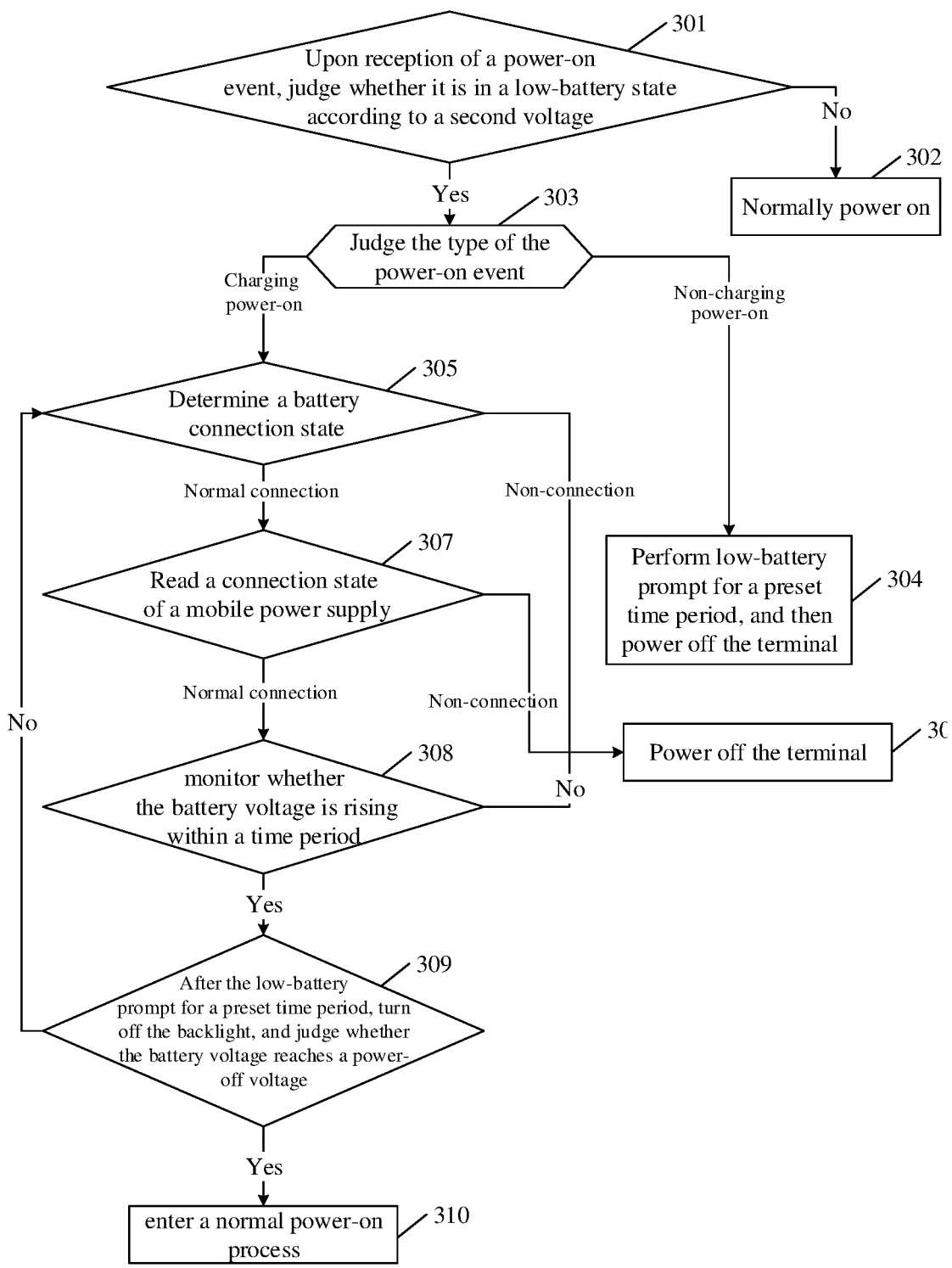
FIG. 3 is a flow diagram of a method for performing power-on processing in a low-battery state according to a third embodiment of the disclosure.

A method for performing power-on processing in a low-battery state is provided in the second embodiment of the disclosure. As shown in FIG. 2, here, a terminal is in a power-off state by default initially and receives a power-on event in a power-off state. The method includes the steps as follows.

At S201, upon reception of a power-on event, a system starting process is triggered.

When receiving the power-on event, the terminal triggers the system starting process, and executes codes of a system version to complete system starting.

At S202, it is judged whether a current battery voltage is in a low-battery state.

Specifically, it is judged whether the current battery voltage is less than or equal to a power-off voltage; if yes, it indicates that the power-off state of the terminal is a low-battery power-off state, and S203 is performed; and if no, it is determined that the power-off state of the terminal is not a low-battery power-off state, S204 is performed.

At S203, a power-on type is judged.

Here, according to whether the terminal is being charged when being powered on, the power-on type of the terminal is divided into charging power-on and non-charging power-on. When the power-on type is the charging power-on, S205 is performed, and when the power-on type is the non-charging power-on, S206 is performed.

At S204, a power-on process is continued. At this time, the terminal is in a non-low-battery power-on state, a sufficient voltage is provided to execute a power-on operation, and the terminal enters a normal power-on process.

At S205, a low-battery prompt is presented for a preset time period, and then the terminal is powered off.

At this time, a low-battery display prompt such as picture flooding or text display is presented in a screen, and the low-battery prompt is held for a preset time period, and then power-off is performed.

At S206, a low-battery prompt is presented, and the terminal is charged to a third voltage.

A low-battery display prompt such as picture flooding or text display is presented in the screen, and the voltage of the battery charged currently is monitored to get a third voltage.

At S207, it is judged whether the third voltage is higher than the power-off voltage.

If yes, S208 is performed, and if no, S206 is re-performed.

At S208, the terminal is powered on, and enters a normal charging state.

In the embodiment of the disclosure, for example, if a platform used by the terminal is a Qualcomm platform, and the starting of the terminal includes PBL-SBL-LK-KERNEL-user space. When the system is started, a low-battery prompt may be presented in the LK stage. After the low-battery prompt, power-off is performed according to the power-on type of the power-on event, or the power-on process is continued.

In the embodiment of the disclosure, when the terminal receives the power-on event to trigger a system to start, after the system is started, it is determined whether the power-off state of the terminal is a low-battery power-off state according to the current battery voltage. When the battery voltage is lower than or equal to the power-off voltage, the terminal is in the low-battery power-off state, so that the low-battery prompt is presented in the screen, and corresponding power-on/off processing is performed according to the power-on type of the power-on event. When the battery voltage is higher than the power-off state, the normal power-on process is performed.

In the embodiment of the disclosure, the battery voltage of the low-battery power-off state is lower than or equal to the power-off voltage and is higher than or equal to the system starting voltage, so that the terminal can perform the system starting process when receiving the power-on event in the power-off state.

In practical applications, before S201 of the embodiment of the disclosure, S200 may be included, i.e., setting of configuration information, which specifically includes: settings of a system starting voltage, a power-off voltage and a low-battery prompt, and different power-on types correspond to different power-on/off processing, specifically as follows.

At S2001, the system starting voltage and the power-off voltage are set. The power-off voltage ensures that the battery has a certain amount of available electricity, so as to allow the terminal to smoothly enter the low-battery prompt stage after being powered off, to prevent the battery voltage from falling near over-discharge; and the system starting voltage can ensure that the terminal may enter the low-battery prompt stage. The system starting here refers to power-on from the perspective of a developer, which refers to triggering the system starting process.

At S2002, the low-battery prompt is set. This setting is used to complete a low-battery prompt function. When it is determined that the low-battery prompt is required according to the sampled battery voltage value, the low-battery prompt is presented according to this setting. Data for the low-battery prompt may include picture content, text content, etc., and the data for the low-battery prompt may be stored in a separate partition or in other storage modes.

At S2003, different power-on/off processing is performed according to different power-on types in the low-battery prompt stage. When the power-on type is the low-battery prompt under charging power-on, it also includes response and logic control to various scenarios, such as response to the button, control of the screen backlight, response of the battery abnormality, abnormal response of the charging device, and response after voltage rising.

Here, there is no specific executing sequence for the settings of S2001, S2002, and S2003.

By means of the embodiment of the disclosure, when the battery voltage is equal to or higher than the system starting voltage and is lower than or equal to the power-off voltage, the low-battery prompt is presented in the screen to prompt the user that the terminal is in a low-battery state currently; and when the battery voltage is higher than the power-off voltage, the power-on process is successfully completed, and charging is performed. When the voltage of the battery is the power-off voltage, there is a certain amount of available electricity stored, and the system starting voltage can ensure that the power-on process smoothly enters a low-battery prompt stage. Therefore, the method of the embodiment of the disclosure can ensure that the terminal may prompt the user with the low battery, thereby achieving a good user experience effect.

Third Embodiment

Figure 4:
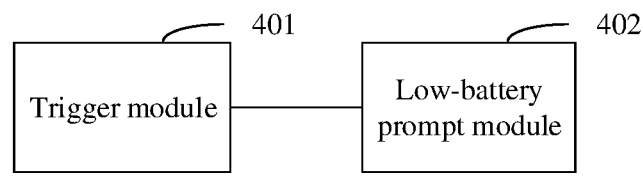
FIG. 4 is a structural diagram of an apparatus for performing power-on processing in a low-battery state according to a fourth embodiment of the disclosure.

A method for performing power-on processing in a low-battery state is provided in a third embodiment. In the embodiment of the disclosure, the method of the embodiment of the disclosure is illustrated by taking a mobile power supply as a charging device. At this time, a terminal is in a power-off state. As shown in FIG. 4, the method includes the steps as follows.

At S301, upon reception of a power-on event, it is judged whether the terminal is in a low-battery state according to a second voltage.

When the power-on event is received, a battery voltage is collected to obtain a second voltage, and when the battery voltage is lower than or equal to a power-off voltage, it is determined that the power-off state of the terminal is a low-battery power-off state. At this time, the terminal is in the low-battery state, the terminal enters a low-battery prompt stage, and S303 is performed. Otherwise, S302 is performed, and the terminal is normally powered on.

At S303, the type of the power-on event is judged.

The type of the power-on event is judged according to a power-on reason. For example, when the power-on reason is power-on by long-pressing a power-on/off button, the power-on type is non-charging power-on, and S304 is performed. When the power-on reason is being connected to a mobile power supply, the power-on type is charging power-on, and S305 is performed.

At S304, a low-battery prompt is presented for a preset time period.

A low-battery prompt is presented, and after a preset time period, a power-off process is performed in S306 to power the terminal off. Here, the preset time period may be 10-30 seconds, so that a user has enough time to see the low-battery prompt in a low-battery scenario, and the value of the preset time period is not specifically limited in the embodiment of the disclosure.

At S305, a battery connection state is determined.

When the connection state is that a battery is not connected, the state of the terminal is abnormal, and a power-off process is performed in S306 to power the terminal off. When the battery is normally connected, the state of the terminal is normal, and S307 is performed.

At S306, the terminal is powered off.

At S307, the connection state of the mobile power supply is read.

The connection state of the mobile power supply is determined according to the connection state between the terminal and the mobile power supply. When the connection state of the mobile power supply is "connected", S308 is performed. When the connection state of the mobile power supply is "not connected", it indicates that the connection of the mobile power supply is abnormal after the terminal is charged to be powered on, and a power-off process in S306 is performed to power the terminal off.

At S308, it is monitored whether the battery voltage rises within a time period.

The voltage of the battery is monitored. When the voltage of the battery does not rise within a time period, it indicates that the terminal is not normally charged although the connection to the mobile power supply is normal, abnormality occurs for the charging of the terminal, the charging has been stopped, a power-off process in S306 is performed to power the terminal off, and otherwise, S309 is performed.

At S309, after the low-battery prompt is presented for a preset time period, the backlight is turned off, and it is judged whether the battery voltage reaches a power-off voltage.

When the voltage of the battery continues to rise within a time period, a low-battery prompt is presented for a preset time period. When the time period for the low-battery prompt reaches a preset time period, a timeout process is performed to turn off the backlight and perform the screen-off. When the battery voltage reaches the power-off voltage, S310 is performed to enter a normal power-on process.

It should be noted that if the battery voltage does not reach the power-off voltage, when the screen-off terminal receives a short-pressing power button triggering command, the screen is on; and when the screen-on terminal receives the short-pressing power button triggering command, the screen is off, and then S305 is performed to monitor various charging states of the battery.

The value of the preset time period in S309 here is the same as or may be different from the value of the preset time period in S304.

In practical applications, the entire low-battery power-on process is a polling operation, and a certain delay may be added to each step to alleviate the processor load.

In the embodiment of the disclosure, when it is determined that the terminal is powered on to be charged, various abnormal conditions that may exist in the terminal are polled until the battery voltage rises to a certain value, which is sufficient to complete the power-on process, including the battery voltage state, the battery connection state, and the charging device connection state, the low-battery prompt state, the button processing process, etc.

Fourth Embodiment

In order to implement the above method for performing power-on processing in a low-battery state, the embodiment of the disclosure also provides an apparatus for performing power-on processing in a low-battery state. As shown in FIG. 4, the apparatus includes a trigger module 401 and a low-battery prompt module 402.

The trigger module 401 is arranged to trigger, when a terminal receives a power-on event in a low-battery power-off state, a system to start according to the power-on event. A battery voltage in the low-battery power-off state is less than or equal to a power-off voltage and is greater than or equal to a system starting voltage.

The trigger module 401 is further arranged to detect, when the terminal receives the power-on event, the battery voltage to be a second voltage, and determine that the terminal receives the power-on event in the low-battery power-off state when the second voltage is less than or equal to the power-off voltage.

The low-battery prompt module 402 is arranged to present, after the system is started, a low-battery prompt in a screen.

Figure 5:
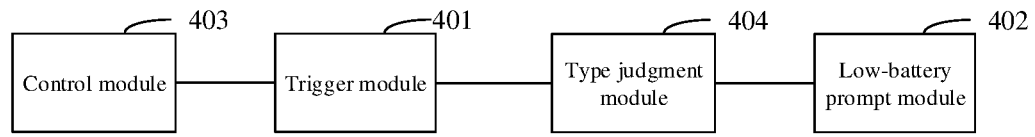
FIG. 5 is a structural diagram of another apparatus for performing power-on processing in a low-battery state according to the fourth embodiment of the disclosure.

As shown in FIG. 5, the apparatus may further include a control module 403, arranged to control the terminal to enter a low-battery power-off state. The control module 403 is specifically arranged to monitor the battery voltage to get a first voltage, and control, when the first voltage is less than or equal to the power-off voltage, the terminal to enter a low-battery power-off state.

As shown in FIG. 5, the apparatus may further include a type judgment module 404, arranged to judge a power-on type of the power-on event, the power-on type including charging power-on and non-charging power-on.

Correspondingly, the low-battery prompt module 402 is further arranged to perform corresponding power-on/off processing after a low-battery prompt is presented according to the power-on type of the power-on event.

Herein, the low-battery prompt module 402 is specifically arranged to present, when the power-on type is charging power-on, a low-battery prompt after the system is started, and monitor the battery voltage to get a third voltage; and stop, when the third voltage is greater than the power-off voltage, the low-battery prompt, and perform power-on processing.

The low-battery prompt module 402 is specifically arranged to present, when the power-on type is non-charging power-on, a low-battery prompt for a preset time period after the system is started, and execute a power-off operation after the low-battery prompt is presented for the preset time period.

Here, the operation that the low-battery prompt module 402 presents a low-battery prompt includes that: preset data for the low-battery prompt is acquired from a storage area, and the data for the low-battery prompt is displayed.

If the integrated module in the embodiment of the disclosure is implemented in the form of a software function module and is sold or used as an independent product, the product may also be stored in a computer-readable storage medium. Based on this understanding, the technical solutions of the embodiment of the disclosure may be substantially embodied in the form of a software product or parts contributing to the existing technology may be embodied in the form of a software product, and a computer software product is stored in a storage medium, including a plurality of instructions enabling a computer device (which may be a personal computer, a server or a network device) to perform all or some of the steps of the method according to each embodiment of the disclosure. The foregoing storage medium includes: various media capable of storing program codes, such as a U disk, a mobile hard disk, a Read-Only Memory (ROM), a Random Access Memory (RAM), a magnetic disk or an optical disc. Thus, the embodiment of the disclosure is not limited to any specific combination of hardware and software.

The above is only the preferred embodiment of the disclosure and is not intended to limit the scope of protection of the disclosure.

INDUSTRIAL APPLICABILITY

According to the method for performing power-on processing in the low-battery state in the embodiment of the disclosure, when a terminal receives a power-on event in a low-battery power-off state, a system is triggered to start according to the power-on event, and after the system is started, a low-battery prompt is presented in a screen, where a battery voltage in the low-battery power-off state is less than or equal to a power-off voltage and is greater than or equal to a system starting voltage. By means of the embodiment of the disclosure, when the terminal is in the low-battery power-off state, the battery voltage is less than or equal to the power-off voltage and is greater than or equal to the system starting voltage. Therefore, when the terminal in the low-battery power-off state receives a power-on event, the system is started with a sufficient voltage, and a low-battery prompt is presented, so that when powering on the terminal in the low-battery power-off state, a user can know that the current terminal is in a low-battery state according to the low-battery prompt after the system of the terminal is started, thereby achieving a better user experience effect without hardware update and chip upgrade.

The invention claimed is:

1. A method for performing power-on processing in a low-battery state, applied to a mobile terminal, comprising:
   receiving, by the mobile terminal, a power-on event in a low-battery power-off state;
   triggering, by the mobile terminal, a system to start according to the power-on event, and beginning a power-on process of the mobile terminal, wherein a battery voltage in the low-battery power-off state is less than or equal to a power-off voltage and is greater than or equal to a system starting voltage;
   judging a power-on type of the power-on event after the system is started;
   presenting, by the mobile terminal, a low-battery prompt in a screen, after the power-on type of the power-on event is judged and before the power-on process is completed for entering a state in which the mobile terminal can be operated;
   performing, according to the power-on type of the power-on event, corresponding power-on/off processing after the low-battery prompt is presented, wherein the power-on type comprises charging power-on and non-charging power-on;
   in response to the power-on type being charging power-on:
      after the system is started, presenting the low-battery prompt and monitoring the battery voltage to get a third voltage; and
      when the third voltage is greater than the power-off voltage, stopping the low-battery prompt and performing the power-on process; and in response to the power-on type being non-charging power-on:
      presenting the low-battery prompt for a preset time period after the system is started; and
      executing a power-off operation after the low-battery prompt is presented for the preset time period.

2. The method according to claim 1, wherein before the mobile terminal receives the power-on event in the low-battery power-off state, the method further comprises: controlling the mobile terminal to enter the low-battery power-off state, comprising:
   monitoring the battery voltage to get a first voltage; and
   controlling the mobile terminal to enter the low-battery power-off state, when the first voltage is less than or equal to the power-off voltage.

3. The method according to claim 1, wherein receiving, by the mobile terminal, the power-on event in the low-battery power-off state comprises:
   when the mobile terminal receives the power-on event, detecting the battery voltage to get a second voltage; and
   when the second voltage is less than or equal to the power-off voltage, determining that the mobile terminal receives the power-on event in the low-battery power-off state.

4. The method according to claim 1, wherein presenting the low-battery prompt comprises:
   acquiring preset data for the low-battery prompt from a storage area; and
   displaying the preset data for the low-battery prompt.

5. A mobile terminal, comprising:
   a processor; and
   a memory storing instructions executable by the processor,
   wherein the processor is arranged to:
      receive a power-on event in a low-battery power-off state;
      trigger a system to start according to the power-on event and beginning a power-on process of the mobile terminal, wherein a battery voltage in the low-battery power-off state is less than or equal to a power-off voltage and is greater than or equal to a system starting voltage;
      judge a power-on type of the power-on event after the system is started, the power-on type comprising: charging power-on and non-charging power-on;
      present a low-battery prompt in a screen after the power-on type of the power-on event is judged and before the power-on process is completed for entering a state in which the mobile terminal can be operated;
      perform, according to the power-on type of the power-on event, corresponding power-on/off processing after the low-battery prompt is presented;
      in response to the power-on type being charging power-on:

after the system is started, present the low-battery prompt and monitor the battery voltage to get a third voltage; and when the third voltage is greater than the power-off voltage, stop the low-battery prompt and perform the power-on process; and in response to the power-on type being non-charging power-on:

present the low-battery prompt for a preset time period after the system is started; and execute a power-off operation after the low-battery prompt is presented for the preset time period.

6. The mobile terminal according to claim 5, wherein the processor is further arranged to:

control the mobile terminal to enter the low-battery power-off state;

monitor the battery voltage to get a first voltage; and control the mobile terminal to enter the low-battery power-off state when the first voltage is less than or equal to the power-off voltage.

7. The mobile terminal according to claim 5, wherein the processor is further arranged to:

detect the battery voltage to get a second voltage when the mobile terminal receives the power-on event; and determine that the mobile terminal receives the power-on event in the low-battery power-off state when the second voltage is less than or equal to the power-off voltage.

8. The mobile terminal according to claim 5, wherein in order to present the low-battery prompt, the processor is further arranged to:

acquire preset data for the low-battery prompt from a storage area; and display the preset data for the low-battery prompt.

9. The method according to claim 1, wherein after presenting the low-battery prompt in the screen for the preset time period, the method further comprises:

turning off a backlight of the mobile terminal;

judging whether the battery voltage reaches the power-off voltage; and in response to the battery voltage reaching the power-off voltage, beginning the power-on process.

10. The mobile terminal according to claim 5, wherein the processor is further arranged to: after presenting the low-battery prompt in the screen for the preset time period, turn off a backlight of the mobile terminal;

judge whether the battery voltage reaches the power-off voltage; and in response to the battery voltage reaching the power-off voltage, begin the power-on process.

* * * * *